US009506652B2

(12) United States Patent
Carrere et al.

(10) Patent No.: US 9,506,652 B2
(45) Date of Patent: Nov. 29, 2016

(54) MULTI-PIERCED COMBUSTION CHAMBER WITH COUNTER-ROTATING TANGENTIAL FLOWS

(75) Inventors: Bernard Joseph Jean-Pierre Carrere, Pau (FR); Jean-Marc Dubourdieu-Rayrot, Mazerolles (FR); Lorenzo Huacan Hernandez, Pau (FR); Robert Serrot-Gracie, Aureilhan (FR)

(73) Assignee: TURBOMECA, Bordes (FR)

( * ) Notice: Subject to any disclaimer, the term of this patent is extended or adjusted under 35 U.S.C. 154(b) by 743 days.

(21) Appl. No.: 13/522,240

(22) PCT Filed: Jan. 11, 2011

(86) PCT No.: PCT/FR2011/050046
§ 371 (c)(1),
(2), (4) Date: Nov. 2, 2012

(87) PCT Pub. No.: WO2011/086320
PCT Pub. Date: Jul. 21, 2011

(65) Prior Publication Data
US 2013/0047621 A1  Feb. 28, 2013

(30) Foreign Application Priority Data
Jan. 15, 2010 (FR) ...................................... 10 50257

(51) Int. Cl.
*F23R 3/12* (2006.01)
*F23R 3/00* (2006.01)
(Continued)

(52) U.S. Cl.
CPC ................ *F23R 3/002* (2013.01); *F23R 3/12* (2013.01); *F23R 3/14* (2013.01); *F23R 3/54* (2013.01); *F23R 2900/03041* (2013.01); *F23R 2900/03042* (2013.01); *Y02T 50/675* (2013.01)

(58) Field of Classification Search
CPC  F23R 3/002; F23R 3/06; F23R 2300/03041; F23R 2300/03042; F23R 3/04; F23R 3/10; F23R 3/12; F23R 2900/03041; F23R 2900/03042
USPC .................. 60/756, 755, 752, 737, 740, 748
See application file for complete search history.

(56) References Cited

U.S. PATENT DOCUMENTS 5,129,231 A * 7/1992 Becker et al. .................. 60/754
5,918,467 A * 7/1999 Kwan ............................. 60/754
(Continued)

FOREIGN PATENT DOCUMENTS

EP      1 363 078 A2     11/2003
JP      2003-329242 A    11/2003
(Continued)

OTHER PUBLICATIONS

International Search Report Issued May 2, 2011 in PCT/FR11/50046 Filed Jan. 11, 2011.
(Continued)

*Primary Examiner* — William H Rodriguez
*Assistant Examiner* — Jason H Duger
(74) *Attorney, Agent, or Firm* — Oblon, McClelland, Maier & Neustadt, L.L.P.

(57) ABSTRACT

A combustion chamber, for example for a turbine engine, presenting an inner annular wall, an outer annular wall, and a pierced annular chamber end wall extending around an axis, the chamber end wall including at least one opening receiving a fuel injector, the opening being substantially centered on a circular line defining a first chamber end wall portion extending radially between the circular line and the inner annular wall, and a second chamber end wall portion extending radially between the circular line and the outer annular wall. First and second channels are inclined relative to a normal vector normal to the chamber end wall while extending tangentially, the first channels arranged to provide a flow of air in a first rotary direction, the second channels arranged to provide a flow of air in a second rotary direction opposite to the first rotary direction.

13 Claims, 4 Drawing Sheets

(51) Int. Cl.
*F23R 3/14* (2006.01)
*F23R 3/54* (2006.01)

(56) References Cited

U.S. PATENT DOCUMENTS

| | | |
|---|---|---|
| 5,956,955 A | 9/1999 | Schmid |
| 7,146,816 B2 * | 12/2006 | Anderson ............... F23R 3/002 60/754 |
| 2005/0138931 A1 | 6/2005 | Pacheco-Tougas et al. |
| 2006/0042263 A1 * | 3/2006 | Patel et al. ...................... 60/776 |
| 2006/0272335 A1 * | 12/2006 | Schumacher et al. .......... 60/804 |

FOREIGN PATENT DOCUMENTS

| | | |
|---|---|---|
| JP | 2008-510955 A | 4/2008 |
| WO | WO 2006/021098 A1 | 3/2006 |

OTHER PUBLICATIONS

Office Action issued Aug. 26, 2014 in Japanese Patent Application No. 2012-548466 (with English language translation).

* cited by examiner

MULTI-PIERCED COMBUSTION CHAMBER WITH COUNTER-ROTATING TANGENTIAL FLOWS

FIELD OF THE INVENTION

The present invention relates to the field of combustion chambers, in particular for turbine engines.

BACKGROUND OF THE INVENTION

More precisely, the present invention relates to a combustion chamber, in particular for a turbine engine, the combustion chamber presenting an annular shape about an axis, an inner annular wall, an outer annular wall, and an annular chamber end wall extending around said axis, said chamber end wall extending radially between the inner annular wall and the outer annular wall, the chamber end wall being provided with at least one opening for receiving a fuel injector, said opening being substantially centered on a circular line defining a first chamber end wall portion extending radially between the circular line and the inner annular wall, and a second chamber end wall portion extending radially between the circular line and the outer annular wall, in which combustion chamber a plurality of first channels are formed in the first chamber end wall portion and a plurality of second channels are formed in the second chamber end wall portion.

This type of combustion chamber is well known, and an example is described in document FR 2 733 582.

It is known to pierce the chamber end wall with a plurality of channels in order to provide a flow of cooling fluid inside the combustion chamber. The cooling fluid, generally air coming from the compressor, sweeps over the inside surfaces of the inner and outer annular walls in such a manner as to create protective air films.

In a known embodiment, the first channels are oriented radially in such a manner that the cooling fluid sweeps over the inside surface of the inner annular wall, while the second channels are oriented radially in such a manner that the cooling fluid sweeps over the inside surface of the outer annular wall.

Such a configuration for the channels is most advantageous for cooling the outer and inner annular walls.

Nevertheless, the fuel injector is usually associated with a swirler that generates a vortex of air centered on the opening. It can thus be understood that the rotary movement of the air coming from the swirler is highly disturbed by the radial flows coming from the channels.

In addition, that configuration requires first and second channels to be arranged in alternation on the circular line, i.e. on a common diameter. The small bridge of material between the channels arranged along this circular line requires great precision in fabrication, gives rise to a high risk of rejects, and furthermore weakens the mechanical strength of the chamber end wall.

OBJECT AND SUMMARY OF THE INVENTION

An object of the present invention is to provide a combustion chamber that remedies the above-mentioned drawbacks.

The invention achieves its object by the fact that the first and second channels are inclined relative to a normal vector normal to the chamber end wall while extending tangentially, and by the fact that the first channels are arranged in such a manner as to enable air to flow around the axis of the combustion chamber in a first rotary direction while the second channels are arranged in such a manner as to enable air to flow around the axis of the combustion chamber in a second rotary direction opposite to the first rotary direction.

In other words, the first and second channels are inclined relative to a plane orthogonal to said axis.

It can thus be understood that the first and second channels enable two rotary flows of air to be created that turn in opposite directions about the axis of the combustion chamber.

By means of the invention, there is no longer any need to provide first and second channels in alternation on the circular line, thereby improving the mechanical strength of the combustion chamber.

In a preferred embodiment in which the combustion chamber includes at least one swirler co-operating with the opening in order to be mounted with the fuel injector, the swirler is arranged in such a manner as to generate a rotary flow of air around the opening, and thus around the injector, in phase with the first and second rotary directions.

In other words, unlike the prior art, the rotary flows of air created by the first and second channels are in phase with the swirling flow of air generated by the swirler.

It can thus be understood that the rotary flows advantageously accompany the flow of air created by the swirler. One advantage is to improve the efficiency of each of the injectors of the combustion chamber, thus advantageously making it possible, for a given combustion chamber, to reduce the number of injectors. This reduces the cost and the weight of the combustion chamber.

Advantageously, the first and second channels are inclined relative to said normal vector (or to the plane perpendicular to the axis), at an angle having an absolute value lying in the range 10° to 40°.

In a variant, a plurality of third channels are arranged in the first end wall portion, said third channels being inclined relative to the normal vector (or to the plane perpendicular to the axis) while extending radially. Preferably, the third channels are arranged in such a manner as to provide a substantially centripetal radial flow of air. Also preferably, the third channels are arranged in the proximity of the inner annular wall.

In this variant, a plurality of fourth channels are arranged in the second end wall portion, said fourth channels being inclined relative to the normal vector (or to the plane perpendicular to the axis) while extending radially. Preferably, the fourth channels are arranged in such a manner as to provide a substantially centrifugal radial flow of air. Also preferably, the fourth channels are arranged in the proximity of the outer annular wall.

BRIEF DESCRIPTION OF THE DRAWINGS

The invention can be better understood and its advantages appear better on reading the following description of two embodiments given as non-limiting examples. The description refers to the accompanying drawings, in which.

MORE DETAILED DESCRIPTION

Figure 1:
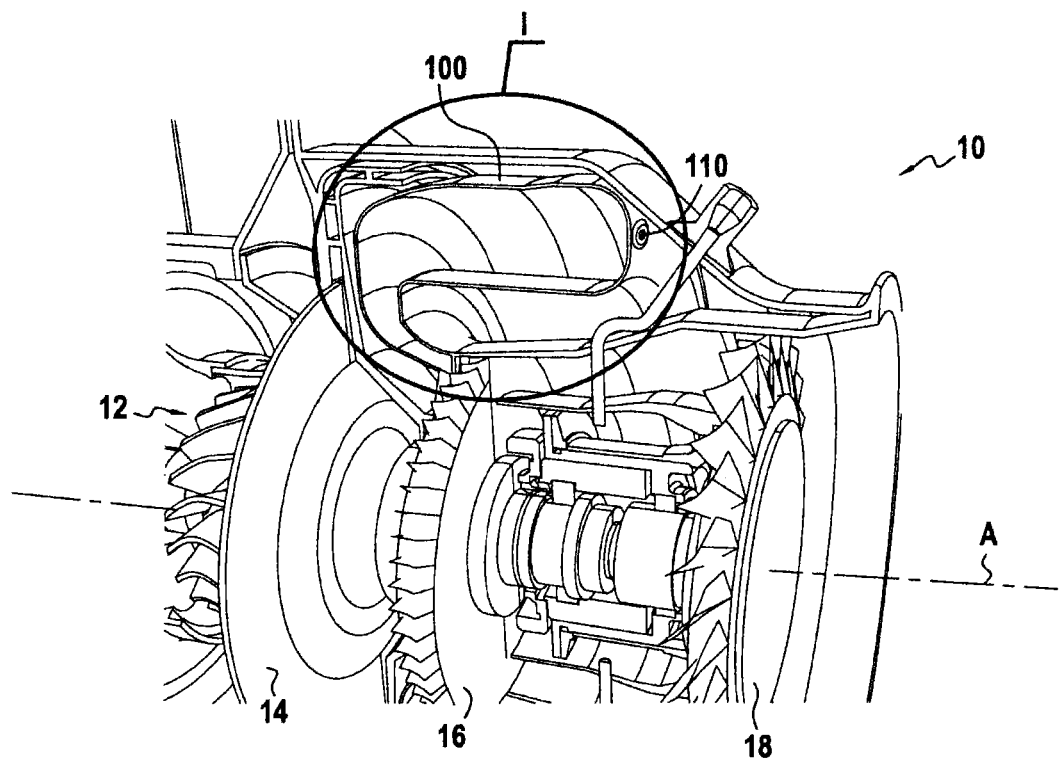
FIG. 1 is a fragmentary section view of an aircraft turbine engine having an annular combustion chamber of the present invention.

The combustion chamber of the invention is described below with reference to a particular and non-limiting embodiment in which said chamber is mounted in an aircraft turbine engine 10, specifically a helicopter engine.

In known manner, the engine 10 has a gas generator 12 comprising a centrifugal compressor wheel 14 for generating a stream of compressed air. This air stream is taken to a combustion chamber 100 in accordance with the invention where it is mixed with fuel. The mixture is then burnt in the combustion chamber, and the resulting stream of burnt gas serves to drive rotation of a high-pressure turbine 16 and of a free turbine 18.

As can be seen in FIG. 1, the combustion chamber 100 is of annular shape about an axis A, this axis corresponding substantially to the axis of rotation of the turbines 16 and 18.

Figure 1A:
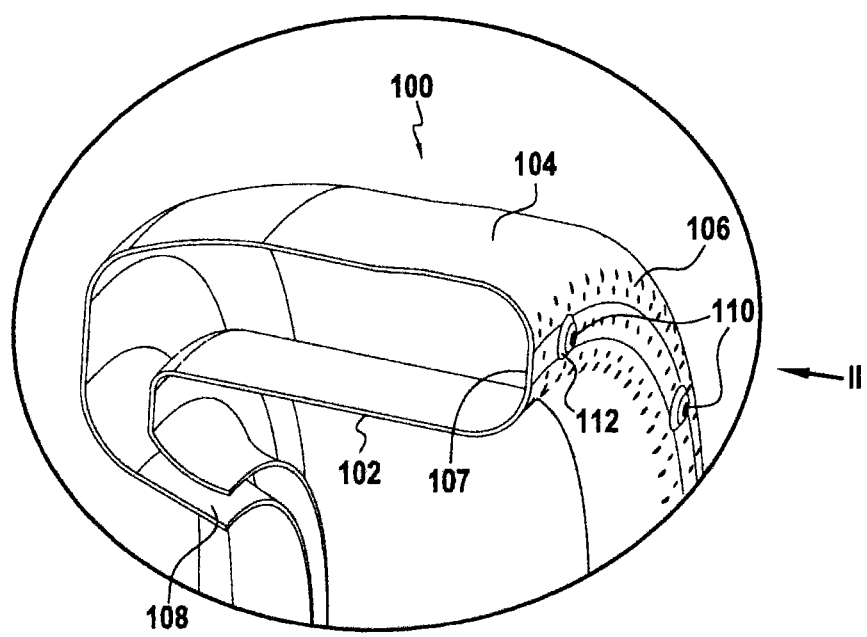
FIG. 1A is a detail view of FIG. 1, showing a portion of the combustion chamber without its injectors.

With reference to FIG. 1A, it can be seen that the combustion chamber 100 has an inner annular wall 102, an outer annular wall 104, and a chamber end wall 106, these elements defining the inside volume of the combustion chamber 100. Furthermore, the combustion chamber 100 also has an outlet 108 through which burnt gas is exhausted. It can also be seen that the combustion chamber 100 is of the "reverse-flow" type, compressed air entering into the combustion chamber taking place in particular via the chamber end wall.

Relative to the axis A, the outer annular wall 104 presents a radial height that is greater than that of the inner annular wall 102. Furthermore, the outer and inner annular walls are substantially coaxial.

As can be seen from FIG. 1A, the chamber end wall 106 extends radially between the inner annular wall 102 and the outer annular wall 104. Fuel is injected into the combustion chamber 100 via the chamber end wall 106 using fuel injectors (not shown herein) that are well known from elsewhere.

These fuel injectors are mounted in openings 110 passing axially through the chamber end wall 106.

In this embodiment, the openings 110 are fitted with swirlers 112, known from elsewhere, that serve to create a flow of air swirling around the fuel injectors for the purpose of facilitating the mixing of air and fuel.

Figure 2:
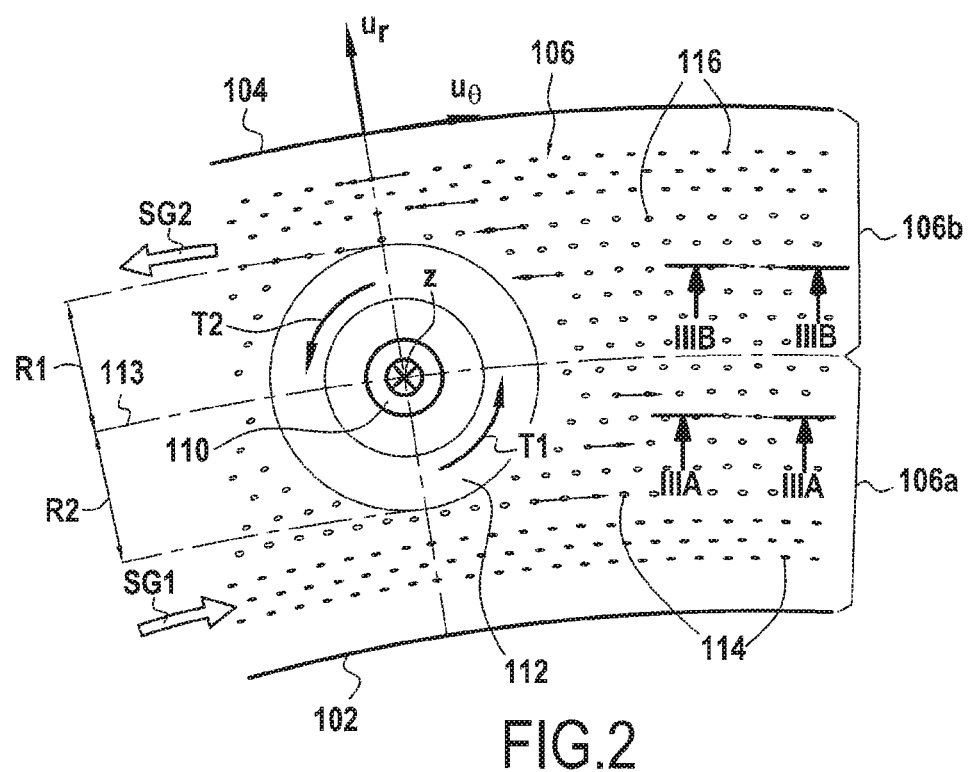
FIG. 2 shows the end wall of the FIG. 1A combustion chamber in which first and second channels are formed, with the air flows generated by the first and second channels being shown in the figure together with the swirling flow generated by the swirler.

Reference is made below to FIG. 2 which is a detail view of the chamber end wall 106 seen axially from outside the combustion chamber 100.

In order to facilitate understanding the invention, a frame of reference $(u_r, u_\theta, Z)$ is defined relative to the axis A of the combustion chamber, where $u_r$ is a radial axis, $u_\theta$, is a circumferential axis, and z is an axis parallel to the axis A.

In the invention, the opening 110 is centered on a circular line 113 centered on the axis A and radially defining a first chamber end wall portion 106a that extends radially between said circular line 113 and the inner annular wall 102, and a second chamber end wall portion 106b radially extending between the circular line 113 and the outer annular wall 104, the first and second chamber end wall portions thus extending annularly around the axis A.

As can be seen in FIG. 2, the circular line 113 is preferably situated radially halfway between the outer and inner annular walls 104 and 102.

The first chamber end wall portion 106a is pierced by a plurality of first channels 114 passing through the thickness e of the chamber end wall 106. The second chamber end wall portion 106b is likewise pierced by a plurality of second channels 116 passing through the thickness e of the chamber end wall 106. As mentioned above, these first and second channels contribute to cooling the outer and inner annular walls and to cooling the end wall 106 of the combustion chamber 100.

In accordance with the invention, the first and second channels 114 and 116 are inclined relative to a vector n normal to the outside surface of the chamber end wall 106. Once more, the first and second channels 114 and 116 extend in a tangential (azimuth) direction, i.e. in a direction parallel to the circumferential axis $u_\theta$.

Figure 2A:
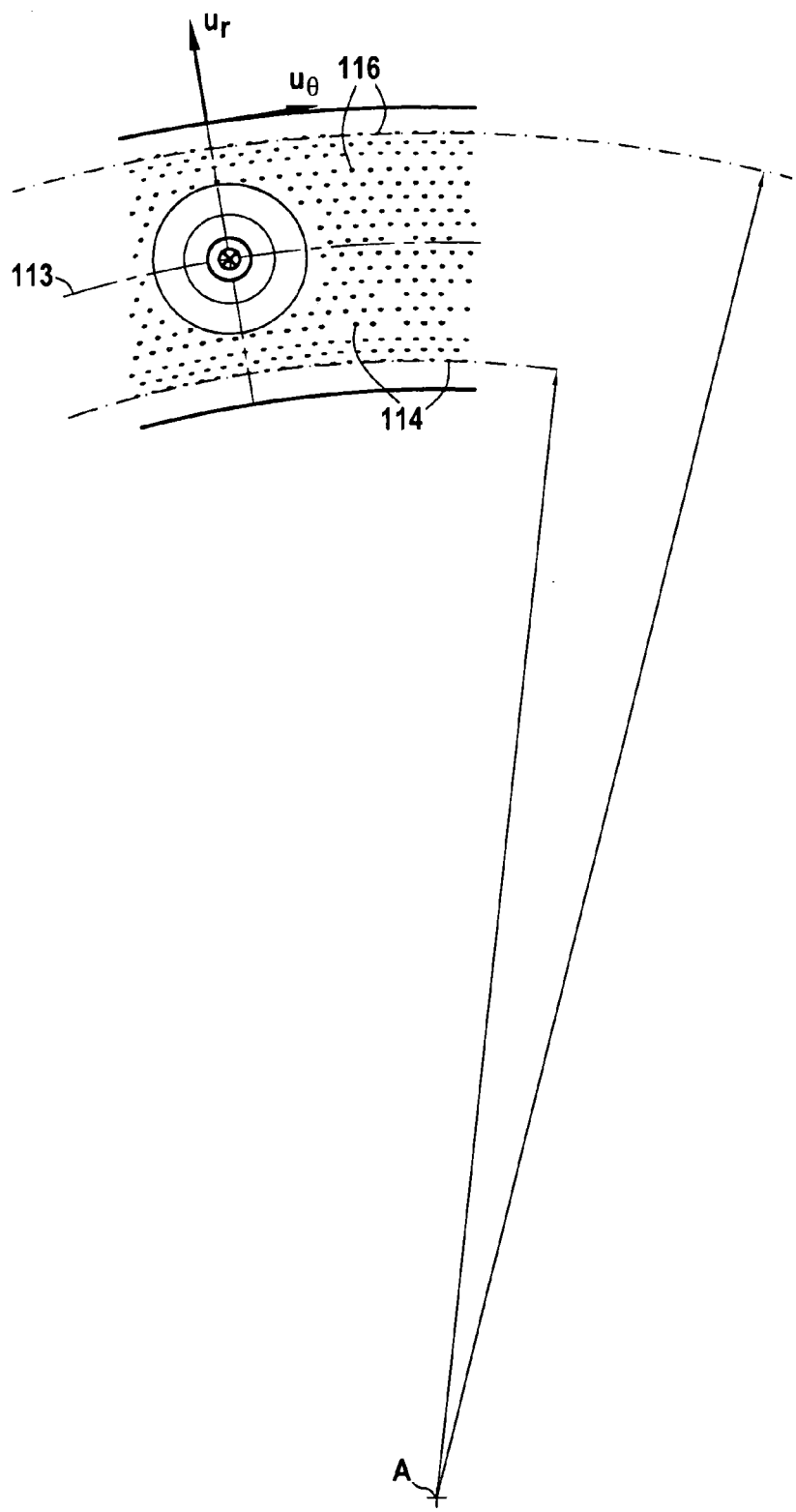
FIG. 2A shows the end wall of the FIG. 1A combustion chamber in which first and second channels are formed and a projection of each of the first and each of the second channels onto a plane orthogonal to an axis of the combustion chamber being tangential to a circle centered on the axis.

Thus, in the meaning of the invention, the projection of each of the first and second channels onto a plane orthogonal to the axis A is tangential to a circle centered on the axis A, as shown in FIG. 2A.

Figure 3A:
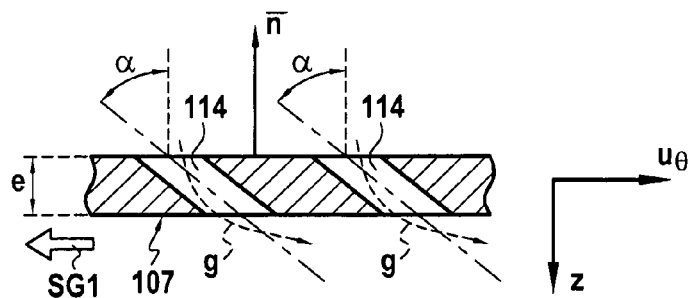
FIG. 3A is a fragmentary section view on plane IIIA that is tangential and perpendicular to the chamber end wall, showing two first channels formed in the thickness of the first portion of the chamber end wall.

With reference to FIG. 3A, which is an axial thickness section view of the first chamber end wall portion 106a, it can be seen that the first channels 114 are inclined at an angle α relative to the vector n, and serve to guide the cooling air towards the inside of the combustion chamber 100. This flow, represented by arrows g, wipes over the inside surface 107 of the chamber end in such a manner as to create a protective film on said inside surface.

By way of example, an angle of inclination may be selected lying in the range 10° to 40°.

Furthermore, from FIG. 3A, it can be seen that the first channels 114 are arranged in such a manner that the flow g is oriented in the direction of the axis $u_\theta$, and as a result the set of first channels 114 is suitable for generating a flow in a first rotary direction SG1. In this example, the first rotary direction SG1 is clockwise. The flow a thus turns around the axis A and thus around the axis of rotation of the turbines 16 and 18.

Figure 3B:
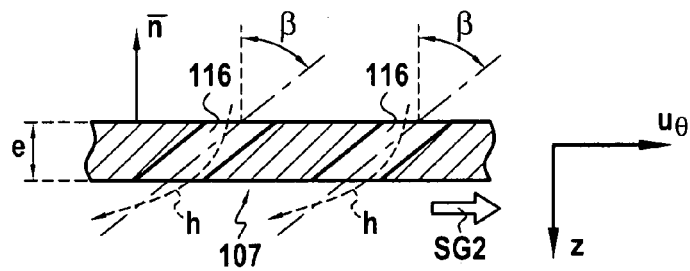
FIG. 3B is a fragmentary section view taken on a plane IIIB that is tangential and perpendicular to the chamber end wall, showing two second channels formed in the thickness of the second portion of the chamber end wall.

With reference now to FIG. 3B, which is an axial thickness section view of the first chamber end wall portion 106b, it can be seen that the second channels 114 are inclined at an angle β relative to the vector n, and serve to guide the cooling air towards the inside of the combustion chamber 100. It is possible likewise to select an angle of inclination β lying in the range 20° to 40°. Preferably β=−α. In other words, the angles α and β are of equal absolute values.

In addition, from FIG. 3b, it can be understood that the second channels 116 are arranged in such a manner that the flow h is in a direction opposite to that of the axis $u_\theta$, and as a result the set of second channels 116 is suitable for generating a flow in a second rotary direction SG2 opposite to the first rotary direction SG1. In this example, the second rotary direction SG2 is thus counterclockwise. The flow h thus turns around the axis A, and thus around the axis of the turbines 16 and 18.

As a result, the radial width of the flow in the first rotary direction SG1 is substantially equal to the radial height over which the first channels 114 are distributed. In this example, this radial width corresponds substantially to the radial width of the first end wall portion 106a. Similarly, the radial width of the flow in the second rotary direction SG2 is substantially equal to the radial height over which the second channels 116 are distributed. In this example, this radial width corresponds substantially to the radial width of the second end wall portion 106b.

The first and second channels are annularly distributed around the axis of the combustion chamber, said distribution preferably being radially localized around the circular line 113, i.e. generally in the middle of the annular chamber end wall.

In FIG. 2, there are also shown arrows T1 and T2 representing the rotary direction of the swirling air stream generated by the swirler 112. This swirling air stream is a vortex centered on the axis z and it is in a counterclockwise direction.

The arrow T1 represents the swirling flow level with the first end wall portion 106a, while the arrow T2 represents the swirling flow level with the second end wall portion 106b.

With reference to FIG. 2, it can be understood that the flow in the first rotary direction SG1 is in phase with the swirling flow T1, while the flow in the second rotary direction SG2 is in phase with the swirling flow T1.

Consequently, it can be understood that in the present invention the cooling air flows generated by the first and second channels 114 and 116 are in phase with the swirling flow direction T1/T2 generated by the swirler 112. As a result the flows generated by the first and second channels advantageously assist and reinforce the swirling flow. The effectiveness of the injectors/swirlers is thus considerably improved. An advantage is thus to be able to reduce the number of injectors and of swirlers so as to reduce the weight and the cost of the combustion system.

Figure 4:
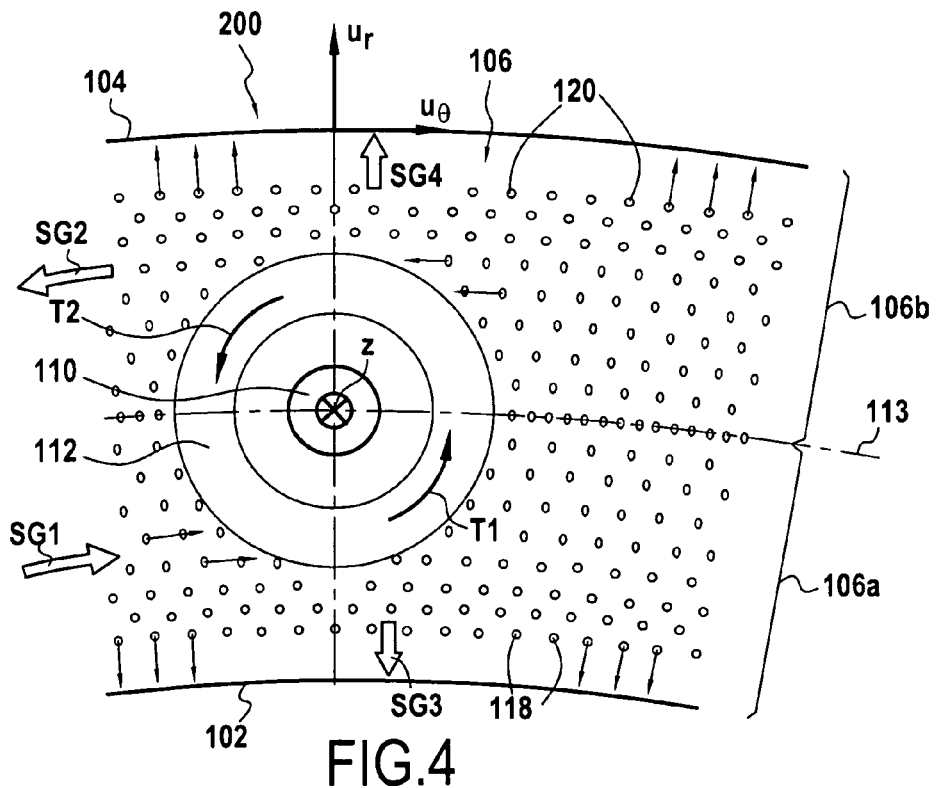
FIG. 4 shows a variant of the FIG. 2 chamber end wall, also showing third and fourth channels formed in the chamber end wall in order to generate radial flows of air.

FIG. 4 shows a variant combustion chamber 200 of the invention.

This combustion chamber 200 differs from the combustion chamber 100 of FIG. 2 by the fact that it further includes a plurality of third channels 118 and a plurality of fourth channels 120.

The third channels 118 are formed in the axial thickness of the first chamber end wall portion 106a. They are inclined relative to the normal vector n, but unlike the first channels, they extend radially in such a manner as to provide a centripetal radial air flow. In other words, the third channels 118 are arranged to generate a flow towards the inside of the combustion chamber in a radial direction SG3 opposite to the direction of the axis $u_r$.

In this example, the third channels 118 are arranged in the proximity of the inner annular wall. More precisely, they are distributed over at least one annular row adjacent to the inner annular wall 102. The radial air stream generated by the third channels serves to improve the cooling of the inside surface of the inner annular wall 102. Furthermore, since this radial air stream SG3 is generated at a distance from the swirler 112, it does not disturb the swirling flow T1.

The fourth channels 120 are arranged in the axial thickness of the second chamber end wall portion 106b. They are inclined relative to the normal vector n, but unlike the second channels, they extend radially in such a manner as to provide a centrifugal radial air flow. In other words, the fourth channels 120 are arranged to generate an air flow inside the combustion chamber in a radial direction SG4 that corresponds to the direction of the axis $u_r$.

In this example, the fourth channels 120 are arranged close to the outer annular wall 104. More precisely, they are distributed over at least one annular row adjacent to the outer annular wall 104. The radial air stream generated by the fourth channels serves to improve the cooling of the inside surface of the outer annular wall 104. Furthermore, since this radial air stream SG4 is generated at a distance from swirler 112, it does not disturb the swirling flow T2.

The invention claimed is:

1. A combustion chamber presenting an annular shape about an axis, comprising:

an inner annular wall, an outer annular wall, and an annular chamber end wall extending around the axis, the annular chamber end wall extending radially between the inner annular wall and the outer annular wall, the annular chamber end wall including at least one opening which receives a fuel injector, the at least one opening being centered on a circular line, the circular line defining a first chamber end wall portion extending radially between the circular line and the inner annular wall and a second chamber end wall portion extending radially between the circular line and the outer annular wall;

a plurality of first channels formed in the first chamber end wall portion and located radially between a radially innermost end of the at least one opening and the circular line; and a plurality of second channels formed in the second chamber end wall portion and located radially between a radially outermost end of the at least one opening and the circular line, wherein the annular chamber end wall is connected to upstream ends of the inner annular wall and the outer annular wall so as to extend radially between the upstream ends of the inner annular wall and the outer annular wall and continuously with the inner annular wall and the outer annular wall, wherein the plurality of first channels and the plurality of second channels are inclined relative to a normal vector normal to the annular chamber end wall while extending tangentially, in a frame of reference (ur, uθ, Z) defined relative to the axis, ur being a radial axis, uθ being a circumferential axis, and Z being an axis parallel to the axis, a tangential direction is a direction parallel to the circumferential axis uθ, wherein the radially innermost end of the at least one opening and the radially outermost end of the at least one opening lie on the radial axis, wherein the plurality of first channels directs air to flow around the axis in a first rotary direction while the plurality of second channels directs air to flow around the axis in a second rotary direction opposite to the first rotary direction, wherein a projection of each of the plurality of first channels and each of the plurality of second channels onto a plane orthogonal to the axis is tangential to a circle centered on the axis, and wherein a radial width of the air flowing in the first rotary direction directed by the plurality of first channels is substantially equal to a radial width of the first chamber end wall portion extending radially between the circular line and the radially innermost end of the at least one opening, and a radial width of the air flowing in the second rotary direction directed by the plurality of second channels is substantially equal to a radial width of the second chamber end wall portion extending radially between the circular line and the radially outermost end of the at least one opening.

2. A combustion chamber according to claim 1, further comprising at least one swirler co-operating with the at least one opening, the swirler generates a rotary air flow around the at least one opening in phase with the first and second rotary directions.

3. A combustion chamber according to claim 1, further comprising a plurality of third channels formed in the first end wall portion, the plurality of third channels being inclined relative to the normal vector while extending radially.

4. A combustion chamber according to claim 3, wherein the plurality of third channels provide a substantially centripetal radial flow of air.

5. A combustion chamber according to claim 3, wherein the plurality of third channels are arranged in proximity of the inner annular wall.

6. A combustion chamber according to claim 5, wherein the plurality of first channels and the plurality of second channels are inclined relative to the normal vector at an angle lying in a range of 10° to 400.

7. A combustion chamber according to claim 1, further comprising a plurality of fourth channels provided in the second end wall portion, the plurality of fourth channels being inclined relative to the normal vector while extending radially.

8. A combustion chamber according to claim 7, wherein the plurality of fourth channels provide a substantially centrifugal radial flow of air.

9. A combustion chamber according to claim 7, wherein the plurality of fourth channels are arranged in proximity of the outer annular wall.

10. A combustion chamber according to claim 3, further comprising a plurality of fourth channels provided in the second end wall portion, the plurality of fourth channels being inclined relative to the normal vector while extending radially.

11. An aircraft turbine engine, comprising a combustion chamber according to claim 1.

12. A combustion chamber according to claim 5, wherein the plurality of third channels are distributed over at least one annular row adjacent to the inner annular wall.

13. A combustion chamber according to claim 9, wherein the plurality of fourth channels are distributed over at least one annular row adjacent to the outer annular wall.

* * * * *